US010733520B2

(12) United States Patent
Llanes-Tosar et al.

(10) Patent No.: US 10,733,520 B2
(45) Date of Patent: Aug. 4, 2020

(54) MAKING A PREDICTION REGARDING DEVELOPMENT OF A SOFTWARE PRODUCT

(71) Applicant: Microsoft Technology Licensing, LLC, Redmond, WA (US)

(72) Inventors: Juan A. Llanes-Tosar, Redmond, WA (US); Flore Q. Yuan, Seattle, WA (US); Aleks M. Gershaft, Redmond, WA (US); Ziying Zheng, Redmond, WA (US); Jacek A. Czerwonka, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1052 days.

(21) Appl. No.: 14/711,255

(22) Filed: May 13, 2015

(65) Prior Publication Data
US 2016/0335555 A1 Nov. 17, 2016

(51) Int. Cl.
*G06N 7/00* (2006.01)
*G06F 11/07* (2006.01)
*G06F 8/70* (2018.01)
*G06F 17/16* (2006.01)

(52) U.S. Cl.
CPC .............. *G06N 7/005* (2013.01); *G06F 8/70* (2013.01); *G06F 11/0706* (2013.01); *G06F 11/0778* (2013.01); *G06F 17/16* (2013.01)

(58) Field of Classification Search
CPC ....... G06N 7/005; G06F 8/70; G06F 11/0706; G06F 11/0778; G06F 17/16
See application file for complete search history.

(56) References Cited

U.S. PATENT DOCUMENTS 6,418,543 B1 * 7/2002 Goli .................... G06F 11/3688
714/38.1
6,519,580 B1 2/2003 Johnson et al.
(Continued)

FOREIGN PATENT DOCUMENTS

CN 102831064 A 12/2012

OTHER PUBLICATIONS

Warfield et al., "Binary Matrices in System Modeling", IEEE Transactions on systems, man, and Cybernetics, vol. SMC-3, No. 3, Sep. 1973.*
Piccart, Beau, "Algorithms for Multi-target Learning", In Dissertation presented in partial fulfillment of the requirements for the degree of Doctor in Engineering, Jun. 2012, 114 pages.
Aho, et al., "Multi-Target Regression with Rule Ensembles", In the Journal of Machine Learning Research, vol. 13 Issue 1, Jan. 1, 2012, 41 pages.
(Continued)

*Primary Examiner* — Robert A Cassity
*Assistant Examiner* — Tsu-Chang Lee
(74) *Attorney, Agent, or Firm* — Dicke, Billig & Czaja, PLLC

(57) ABSTRACT

An automated method of making a prediction regarding development of a software product includes receiving code changes information, build information, and failure information related to the software product. Entries are stored in a database, wherein each entry links a subset of the code changes information with a subset of the build information and with a subset of the failure information. A first matrix and a second matrix are generated using the entries in the database. Multi-target entropy calculations are performed based on the first matrix and the second matrix. The prediction regarding the development of the software product is performed based on the multi-target entropy calculations.

17 Claims, 6 Drawing Sheets

(56) References Cited

U.S. PATENT DOCUMENTS

| | | | | |
|---|---|---|---|---|
| 6,601,018 | B1* | 7/2003 | Logan | G06F 11/3684 |
| | | | | 702/186 |
| 6,934,656 | B2 | 8/2005 | Norman et al. | |
| 7,287,012 | B2 | 10/2007 | Corston et al. | |
| 7,630,950 | B2 | 12/2009 | Wang et al. | |
| 7,685,472 | B1* | 3/2010 | Shibl | G06F 11/3688 |
| | | | | 714/38.13 |
| 8,370,798 | B2 | 2/2013 | Broadfoot et al. | |
| 8,413,117 | B1 | 4/2013 | Coughlan et al. | |
| 8,561,021 | B2 | 10/2013 | Muharsky et al. | |
| 8,561,036 | B1 | 10/2013 | Beans et al. | |
| 8,745,589 | B2 | 6/2014 | Arumugham et al. | |
| 9,471,470 | B2* | 10/2016 | Prasad | G06F 11/3684 |
| 9,646,634 | B2* | 5/2017 | Sainath | G10L 25/30 |
| 2002/0116507 | A1* | 8/2002 | Manjure | H04L 43/50 |
| | | | | 709/229 |
| 2007/0240116 | A1 | 10/2007 | Bangel et al. | |
| 2010/0058294 | A1 | 3/2010 | Best et al. | |
| 2011/0219360 | A1 | 9/2011 | Srinivasa et al. | |
| 2012/0042302 | A1 | 2/2012 | Sikandar et al. | |
| 2014/0053135 | A1* | 2/2014 | Bird | G06F 11/008 |
| | | | | 717/124 |

OTHER PUBLICATIONS

Yusof, et al., "Classification of Machine Learning Engines using Latent Semantic Indexing", In Proceedings of Knowledge Management International Conference, Jul. 4, 2012, 6 pages.

Kaur, et al., "Application of Random Forest in Predicting Fault-Prone Classes", In International Conference on Advanced Computer Theory and Engineering, Dec. 20, 2008, 7 pages.

Fazlalizadeh, et al., "Incorporating Historical Test Case Performance Data and Resource Constraints into Test Case Prioritization", In Proceedings of the Third International Conference, TAP, Jul. 2, 2009, 4 pages.

"International Preliminary Report on Patentability Issued in PCT Patent Application No. PCT/US2016/031689", Mailed Date: Jun. 2, 2017, 7 Pages.

"Second Written Opinion Issued in PCT Application No. PCT/US2016/031689", dated Mar. 7, 2017, 6 Pages.

"International Search Report & Written Opinion Issued in PCT Application No. PCT/US2016/031689", dated Jul. 6, 2016, 12 Pages.

* cited by examiner

MAKING A PREDICTION REGARDING DEVELOPMENT OF A SOFTWARE PRODUCT

BACKGROUND

Software testing is an element of software development processes. A purpose of testing is to ensure that code changes applied to a software product do not compromise product quality. Often, testing is associated with checking for functional correctness. However, for large complex software systems, it also typically involves verifying system constraints, such as backward compatibility, performance, security, etc.

SUMMARY

Some embodiments are directed to predicting a set of test cases to run based on a set of file changes (e.g., a change list) by looking at the historical test activation patterns and file changes patterns, which is helpful to discover problems related to a change list very early on in the development cycle. Some embodiments are directed to predicting a set of files to change (e.g., fix) based on a set of test failures, which is helpful to quickly identify what files are to be modified to fix existing test failures. The system predicts a set of files that have the highest probability of fixing the given set of test failures. In one embodiment, the same infrastructure that is used for predicting test cases to run based on file changes is also used for predicting a set of files to change based on test failures.

One embodiment is directed to an automated method of making a prediction regarding development of a software product. The method includes receiving code changes information, build information, and failure information related to the software product. Entries are stored in a database, wherein each entry links a subset of the code changes information with a subset of the build information and with a subset of the failure information. A first matrix and a second matrix are generated using the entries in the database. Multi-target entropy calculations are performed based on the first matrix and the second matrix. The prediction regarding the development of the software product is performed based on the multi-target entropy calculations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

Figure 1:
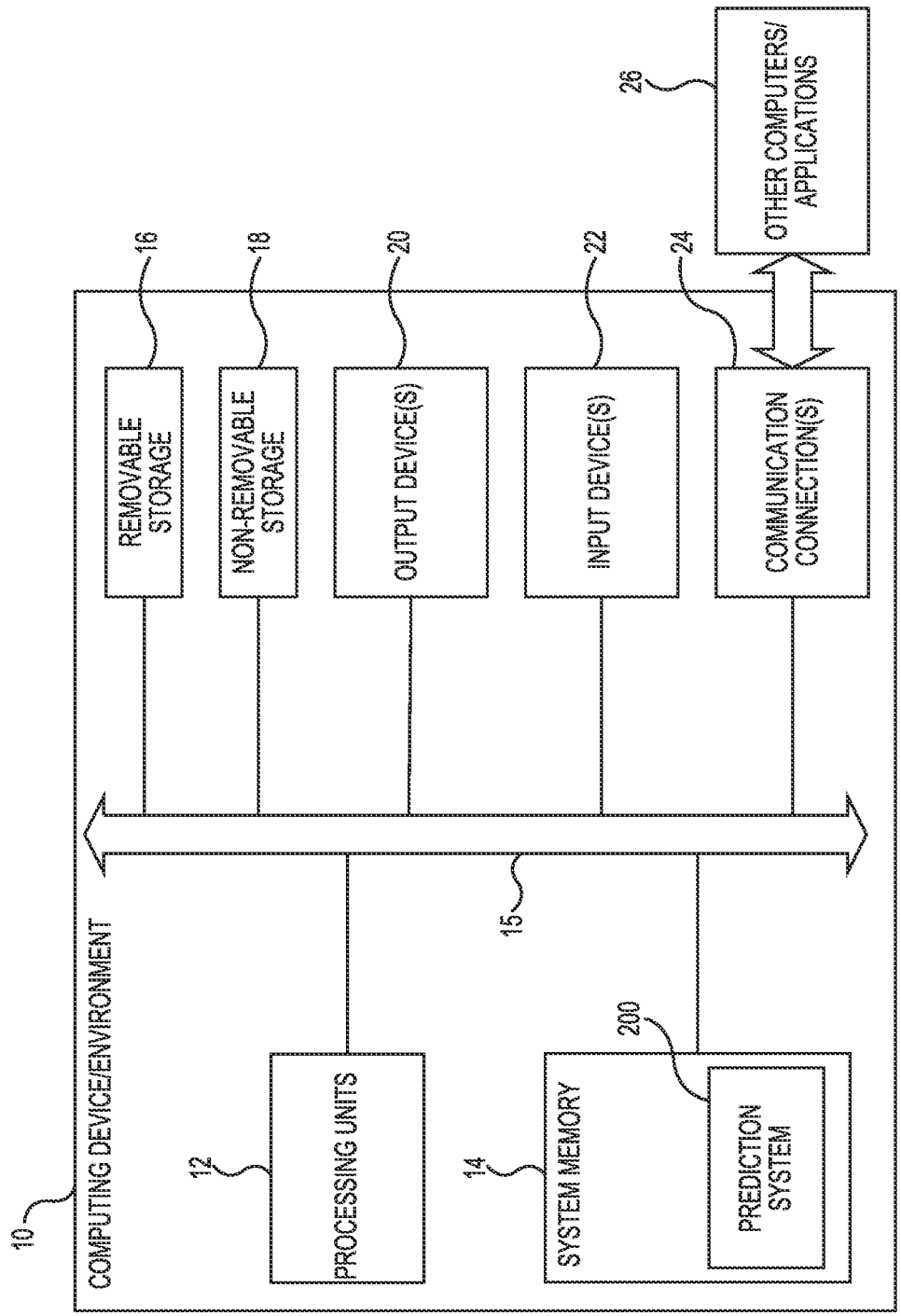
FIG. 1 is a diagram illustrating a computing environment suitable for implementing aspects of a prediction system for software code testing according to one embodiment.

In the following Detailed Description, reference is made to the accompanying drawings, which form a part hereof, and in which is shown by way of illustration specific embodiments in which the disclosure may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

It is to be understood that features of the various exemplary embodiments described herein may be combined with each other, unless specifically noted otherwise.

With the advent of more reliable data collection and persistency, nowadays software engineers have available richer sources of information. One embodiment makes use of three readily available sources of information to make useful predictions aimed at reducing the time to detect bugs as well as the time to mitigate them, which in turn increases code quality and reduces investigation time.

The three sources of historical information data that are used by embodiments disclosed herein include the following: (1) file changes; (2) file compilation into builds; and (3) test results for such builds. In one embodiment, such sources of information are scoped to any large scale code base that follows the following development life cycle: (1) Files get changed iteratively using multiple change lists; (2) file change lists get compiled into a useful entity (e.g., a build); and (3) the build is thoroughly tested and test case failures/fixes are detected, and then the cycle returns to step (1). In one embodiment, given the information in step (1) (i.e., file changes), the system predicts the information in step (3) (i.e., test cases to run). In another embodiment, given the information in step (3) (i.e., test case results), the system predicts the information in step (1) (i.e., files to change). Each of these embodiments will now be described in further detail.

One embodiment predicts a set of test cases to run based on a set of file changes (e.g., a change list) by looking at the historical test activation patterns and file changes patterns, which is helpful to discover problems related to a change list very early on in the development cycle. Test case activation according to one embodiment means that there is a change from the current test case status into a new status. For example, a test case that goes from pass to fail or vice versa is considered a state change. The system predicts what subset of test cases have the highest probability of becoming activated. Such subset of test cases will exercise the most probable active state of the system when such changes are applied onto it.

Complicated patterns of how file modifications affect different test cases are embedded in the history of file changes/test activations. One difference from code coverage approaches is that in exploiting historical patterns, one may find relationships between seemingly disconnected code areas whose dependency is derived from a third/fourth/etc. entity or entities. For example, assume that CodeA is not connected to CodeB directly (no calls go across them), but rather they are interdependent as there exists CodeC (or configuration or data files) whose state gets modified by both CodeA and CodeB at runtime. Now assume CodeA is changed, and that this will modify CodeC's state at runtime, which in turn breaks test cases testing CodeB, but not test cases testing CodeA. From a code coverage perspective, one will run tests covering CodeA, but this will not catch the failures in CodeB. Using the history of failures/fixes, it will have been observed that such areas have a dependency, and thus when changing CodeA, the system should predict one should run some test cases from CodeA and some from CodeB. Indeed, complex systems today are not quite a sum of their individual parts, and thus covering small modules in isolation will not ensure that when such modules are put together the system will work as expected. Rather, systems form a complex network of dependencies where changes may break an unrelated area in the same/different code base.

Another embodiment predicts a set of files to change (e.g., fix) based on a set of test failures, which is helpful to quickly identify what files are to be modified to fix existing test failures. The failures may also be "real-life" failures that exhibit similar symptoms as a test. The system predicts a set of files that have the highest probability of fixing the given set of failures. In one embodiment, the same infrastructure that is used for predicting test cases to run based on file changes is also used for predicting a set of files to change based on test failures. In one form of this embodiment, the different predictions are produced by making a change in the order of matrices passed into the system.

In one embodiment, both approaches discussed above are based purely on historical data analysis, which means that the predictions are based on files changes and tests activation patterns rather than on one-to-one mappings. In one embodiment, predictions are made on collections rather than on a single file/test.

One embodiment is directed to bridging the areas of active product development and active product testing. The data generated from the continuous interaction between such two areas is used to predict what can happen to the system when a new set of changes come in (e.g., a list of file changes), as well as what files or code paths are broken in the system given a new set of failures (e.g. test failures). Historical data is used to find patterns and dependencies between the product code and the test code. One embodiment is directed to a system that is built around the endless loop of continued development and testing. The system can self-reinforce and auto-correct itself based on new data coming in the pipeline such that its prediction capabilities are improved over time.

Some automated systems rely on code coverage to select tests given a change list of files. Code coverage provides data to associate tests with fragments of source code. When source code changes, tests associated with the changed fragments are selected for execution. It is costly to create and maintain the code coverage infrastructure as well as the data collection, the latter often involving a separate test pass. It can be especially expensive if the codebase is large or tests take a long time to execute.

FIG. 1 is a diagram illustrating a computing environment 10 suitable for implementing aspects of a prediction system for software code testing according to one embodiment. In the illustrated example, the computing system or computing device 10 includes one or more processing units 12 and system memory 14. Depending on the exact configuration and type of computing device, memory 14 may be volatile (such as RAM), non-volatile (such as ROM), or some combination of the two.

Computing device 10 may also have additional or different features/functionality and additional or different hardware and software. For example, computing device 10 may also include additional storage (removable and/or non-removable) including, but not limited to, magnetic or optical disks or tape. Such additional storage is illustrated in FIG. 1 by removable storage 16 and non-removable storage 18. Computer storage media includes volatile and nonvolatile, removable and non-removable media implemented in any suitable method or technology for storage of information such as computer readable instructions, data structures, program modules or other data. Memory 14, removable storage 16 and non-removable storage 18 are all examples of computer storage media (e.g., non-transitory computer-readable storage media storing computer-executable instructions that when executed by at least one processor cause the at least one processor to perform a method). Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices. Any such computer storage media may be part of computing device 10. Non-transitory computer-readable storage media as used herein does not include transitory propagating signals.

The various elements of computing device 10 are communicatively coupled together via one or more communication links 15. Computing device 10 also includes one or more communication connections 24, such as network connections, that allow computing device 10 to communicate with other computers/applications 26. Computing device 10 may also include input device(s) 22, such as keyboard, pointing device (e.g., mouse), pen, voice input device, touch input device, etc. Computing device 10 may also include output device(s) 20, such as a display, speakers, printer, etc.

FIG. 1 and the above discussion are intended to provide a brief general description of a suitable computing environment in which one or more examples may be implemented. It should be understood, however, that handheld, portable, and other computing devices of all kinds are contemplated for use. FIG. 1 thus illustrates an example of a suitable computing system environment 10 in which the examples described herein may be implemented, although as made clear above, the computing system environment 10 is one example of a suitable computing environment and is not intended to suggest any limitation as to the scope of use or functionality of the examples. Neither should the computing environment 10 be interpreted as having any dependency or requirement relating to any one or combination of components illustrated in the example operating environment 10.

As shown in FIG. 1, a prediction system 200 for software code testing is stored in system memory 14. One example of system 200 predicts a set of test cases to run based on a set of file changes, and predicts a set of files to change (e.g., fix) based on a set of test failures. System 200 is described in further detail below with reference to FIG. 2.

Figure 2:
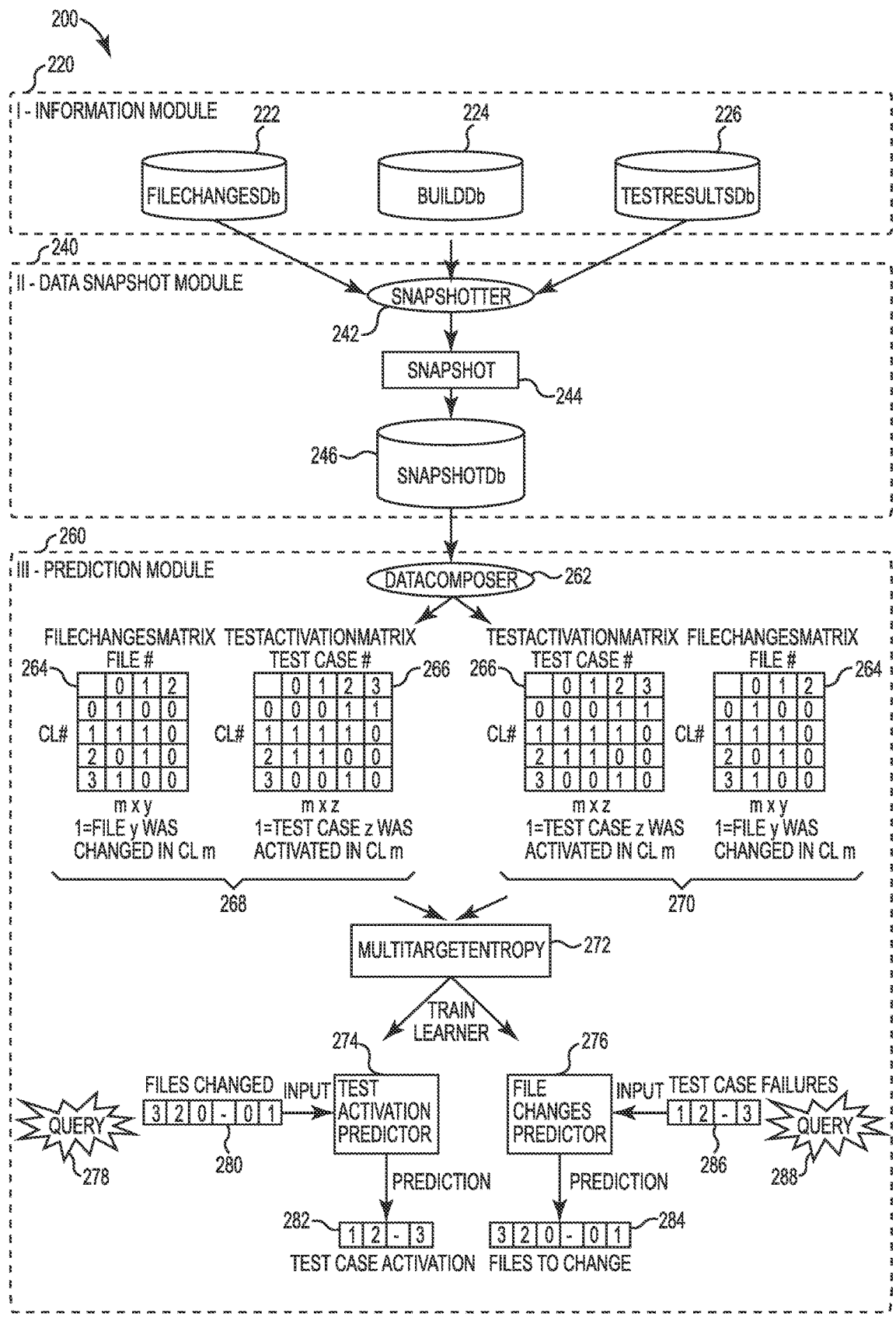
FIG. 2 is a block diagram illustrating modules of a prediction system for software code testing according to one embodiment.

FIG. 2 is a block diagram illustrating modules of prediction system 200 according to one embodiment. Prediction system 200 includes information module 220, data snapshot module 240, and prediction module 260. It is noted that the functionality of the modules in system 200 can be combined into a single module, or can be combined or broken apart in any other desired manner. Each module in system 200 according to one example is a combination of hardware and software executing on that hardware to provide a given functionality.

Information module 220 includes a file changes database (FileChangesDb) 222, a build database (BuildDb) 224, and a test results database (TestResultsDb) 226. The file changes database 222 contains all file changes performed across a timeframe (e.g., source depot repository). The file changes database 222 captures every check-in performed by both developers and testers. The following Table I shows an example of a file changes database 222:

TABLE I

| Change List | | Files changed | |
|---|---|---|---|
| CL 0 | 3 | ... | 5 |
| ... | | | |
| CL N | 2 | ... | 1 |

As shown in Table I, each entry or row in the example file changes database 222 includes an identifier for a change list (e.g., CL 0 through CL N) and an identifier (e.g., file number) for each file that was changed for that change list.

The build database 224 contains the set of change lists that went into a particular build since the last build. The build database 224 captures the delta of change lists going into each build. The following Table II shows an example of a build database 224:

TABLE II

| Build | Change List | | |
|---|---|---|---|
| B 0 | 22 | ... | 66 |
| ... | | | |
| B M | 33 | ... | 44 |

As shown in Table II, each entry or row in the example build database 224 includes an identifier for a build (e.g., B 0 through B M) and an identifier (e.g., change list number) for each change list corresponding to that build.

The test results database 226 is built after each subsequent test pass for a particular build, and contains all test case failures and successes. The following Table III shows an example of a test results database 226:

TABLE III

| Build | Test failed/succeeded | | |
|---|---|---|---|
| B 0 | 7(f) | ... | 8(s) |
| ... | | | |
| B K | 10(s) | ... | 34(f) |

As shown in Table III, each entry or row in the example test results database 226 includes an identifier for a build (e.g., B 0 through B K) and an identifier (e.g., test case number) for each test case corresponding to that build, as well as an indicator for each test case of whether the test case failed (f) or succeeded (s).

The data snapshot module 240 includes a snapshotter component 242, a snapshot 244, and a snapshot database 246. The data snapshot module 240 merges three worlds together by capturing the development life cycle progress into distinct entries in the snapshot database 246. This database 246 becomes then a rich source of information that can then be exploited using a variety of data visualization techniques and machine learning methods. In one embodiment, module 240 links together developers' actions to their immediate result, so that, for example, a new system failure/fix resides in the same database entry as the developer(s) who made file changes that may have broken/fixed it.

The snapshotter component 242 collects data from the three databases 222, 224, and 226, performs some processing and computations, and stores the results into the snapshot database 246. The snapshotter component 242 essentially takes "snapshots" of the constantly running information flow cycle, and each snapshot 244 becomes an entry in the snapshot database 246. Each entry in this database 246 is a snapshot of the software development cycle, and contains what file changes went into a build and which test cases got activated while testing such build. It can be seen in a single snapshot what files were changed and what new failures/new fixes were detected when such files were changed.

Figure 3:
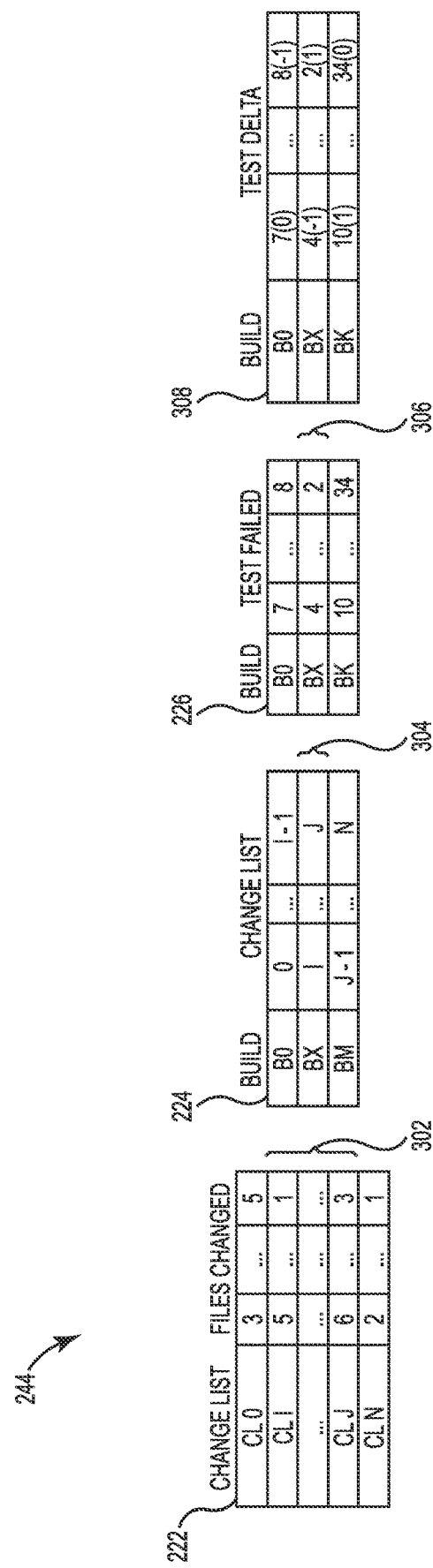
FIG. 3 is a diagram illustrating the creation of a snapshot according to one embodiment.

FIG. 3 is a diagram illustrating the creation of a snapshot 244 according to one embodiment. One of the tasks performed by the snapshotter component 242 (FIG. 2) is to map 302 the new change lists (CL #) submitted into the file changes database 222, to a particular build created in the build database 224, which is later used to run a test pass against, the results of which are stored in the test results database 226 and mapped 304 to the build database 224. Thus, each entry in the snapshot database 246 identifies what new change lists map to the new test case failures. The build is used as the common reference across both worlds in one embodiment, but other embodiments may use any other indicator (e.g., Date) that connects the file changes realm to the test failure one.

In one embodiment, each snapshot 244 includes test delta information 308 mapped 306 to the test results database 226. As shown in FIG. 3, each entry or row in the test delta information 308 includes an identifier for a build and an identifier (e.g., test case number) for each test case corresponding to that build, as well as a test delta indicator (−1, 0, or 1) for each test case. There are two states a test case can be in for an entry in the test results database 226: failed or succeeded. The test delta indicator in the test delta information 308 follows the following encoding in one embodiment.

(1) The test delta indicator is "−1" when a test case begins to fail (i.e., a new failure). For this to occur, the test case has changed from succeeded to failed in two subsequent rows in the test results database 226. An edge case is when a test case appears for the first time, which will also receive a test delta indicator of "−1" if there is no state for it in a previous row in the test results database 226 and it is reported as failed in this first time appearance.

(2) The test delta indicator is "0" when a test case has the same state as the previous recorded entry in the test results database 226. Either the test case went from failed to failed or succeeded to succeeded. An edge case is when a test appears for the first time, which will receive a test delta indicator of "0" if there is no state for it in a previous row in the test results database 226 and it is reported as succeeded in this first time appearance.

(3) The test delta indicator is "1" when a test case ceases to fail (i.e., a new fix). For this to occur, the test case changed from failed to succeeded in two subsequent rows in the test results database 226.

Referring again to FIG. 2, the prediction module 260 includes a data composer component 262, a multi-target entropy component 272, a test activation predictor component 274, and a file changes predictor component 276. The data composer 262 goes over each entry of the snapshot database 246 and builds a data model for performing predictions. In one embodiment, the data composer 262 generates two types of matrices, a file or other code changes (e.g., function) matrix 264 and a test activation matrix 266. In one embodiment, the matrices 264 and 266 are binary matrices. Depending on the "order" these two matrices 264 and 266 are passed down to the multi-target entropy component 272, the prediction module 260 will solve one of two problems: (1) predicting test cases to run based on file changes; or (2) predicting a set of files to change (e.g., fix) based on a set of test failures. By "order" it is meant that depending on which matrix 264 or 266 is considered the feature matrix (versus the target matrix), the prediction module 260 will solve two different problems.

As shown in FIG. 2, for the first problem, the test activation predictor 274 receives a query 278 that includes a file change list 280. In this example, the test activation matrix 266 is the target matrix, as represented by order 268, and based on entropy calculations performed by multi-target entropy component 272, the test activation predictor 274 generates a test activation predictor object 282 that includes a list of test case activations. Test case activation according to one embodiment means that there is a change from the current test case status into a new status. For example, a test case that goes from pass to fail or vice versa is considered a state change. The test activation predictor object 282 identifies a set of test cases that have the highest probability of activation. Thus, given a change list of files, the test activation predictor 274 according to one embodiment predicts a subset of tests to run that will maximize the system probability of becoming activated while minimizing the time to achieve such a task.

For the second problem, the file changes predictor 276 receives a query 288 that includes a test case failures list 286. In this example, the file changes matrix 264 is the target matrix, as represented by order 270, and based on entropy calculations performed by multi-target entropy component 272, the file changes predictor 276 generates a file changes predictor object 284 that includes a list of files to change. The file changes predictor object 284 identifies a set of files/functions/code to change that have the highest probability of fixing a given set of test failures. Solving this problem provides a quick indicator to developers and testers of what files need to be fixed for the current test failures to be resolved.

For the file changes matrix 264, each entry or row includes an identifier for a change list (e.g., CL #) and a file modification indicator for each of a plurality of files. If a file f was modified in a change list c, for example, then such entry will contain a 1, otherwise it contains a 0. The entries in this matrix 264 could be changed so that instead of having 1 or 0, it contains the actual number of changes in the file represented as a number or a percentage (e.g., 10% of the file was changed). This extra information may be used to provide additional functionality. The file changes matrix 264 may also be split down to functions or other smaller code functional units.

The test activation matrix 266 identifies what change list activated which test cases. For the test activation matrix 266, the column index refers to the test case number, and the row index refers to the change list number. Each i,j entry in the matrix 266 is a test activation indicator that is computed from the test delta information 308 (FIG. 3), and it follows the following convention in one embodiment:

(1) The test activation indicator is "1" if the test delta indicator in the snapshot 244 equals 1 or −1. A reason to encode 1 and −1 test delta indicators both as a "1" for the test activation indicator is that the system is interested in what file changes activated a particular set of test cases. Whether it was a fix or a break is irrelevant according to one embodiment, as the system is configured to predict test case activations. Also, note that most likely the same file that breaks a test will also fix the test, and so the test delta indicator that will be shown for such file and the test will be first a −1, then a 1. This is problematic since the column vector will be composed of a combination of 1s and −1s, which has a very high entropy since the system does not predict which state is the relevant one, fixed (1) or broken (−1). However, the system captures the fact that such file change f had an impact (activated) such test case t. To make the formulas capture the latter, both states are represented with a 1, and therefore in the example above, the entropy will be very low since there will be just as many 1's, which means the system is certain that a file change f activated test case t for good or for bad.

(2) The test activation indicator is a "0" if the test delta indicator in the snapshot 244 is 0. Here, the system captures that the change list did not have an effect in such a test case.

One embodiment of the multi-target entropy component 272 uses a variation of the ID3 (Iterative Dichotomiser 3) decision tree method. The variation lies in the way entropy is computed as ID3 solves the problem of a set of features $X_1 \ldots X_n$ mapping to a single target variable t, whereas in the present disclosure, there is a set of features $X_1 \ldots X_n$ mapping to a vector of target variables $T_1 \ldots T_m$. Thus, component 272 according to one embodiment uses a multi-feature, multi-target method (e.g., a set of file changes caused a set of test failures), whereas ID3 uses a multi-feature, single-target method (e.g., a set of failures caused the system to fail in state s). Component 272 also takes care of a few problems that naturally arise during testing as a consequence of using entropy as the core measure of information gain, such as: (1) Environment impact on test results are minimized and in fact can be detected when it is modeled; and (2) unstable test cases are naturally detected and ignored during the process of creating the predictors.

For the test activation predictor 274, the set of features $X_1 \ldots X_n$ refer to the files changed for a particular change list, and the target variables $T_1 \ldots T_m$ refer to the tests activated when such file changes were tested. For example, row 0 for the file changes matrix 264 corresponds to row 0 of the test activation matrix 266. For the file changes predictor 276, the $T_1 \ldots T_m$ is the feature set, and the $X_1 \ldots X_n$ are the target variables. The fact that the order of the matrices can be reversed to solve two different problems using the same infrastructure is a valuable consequence of the mathematical framework used to solve these problems.

The formulas presented here include differences from the ID3 algorithm. Also, they are presented from the point of view of solving the problem where the feature matrix is the file changes matrix 264 and the target matrix is the test activation matrix 266. However the formulas work the same way for the second problem. An equation for gain is provided in the following Equation I, where "S" represents the remaining samples from the test activation matrix 266 after each iteration of the method (at the beginning S equals all rows in the test activation matrix 266):

$$\text{Gain}(S) = \text{MultiTargetEntropy}(S) - \qquad \text{Equation I}$$

$$\sum_{x \in 0|1}^{f} \left( \frac{n_x}{n} * \text{MultiTargetEntropy}(S_x) \right)$$

Where:
    f=a particular attribute (e.g., file) to split on from the file changes matrix 264, which has value x of 0 or 1. There are f attributes (columns) in such a matrix.
    $S_x$=portion of remaining samples S in the test activation matrix 266 whose row index equals the row index in the file changes matrix 264 where the current attribute f has value x. This is done by filtering the samples (the rows).
    $n_x$=number of samples (rows) in $S_x$.
    n=number of samples (rows) in S.

The MultiTargetEntropy($S_x$) in Equation I may be calculated as shown in the following Equation II:

$$\text{MultiTargetEntropy}(S_x) = \Sigma_{j \in 0,1 \ldots, t} \text{Entropy}(S_x[,j]) \qquad \text{Equation II}$$

Where:
    $S_x[,j]$=a column vector from $S_x$
    t=number of columns in the test activation matrix 266.

The Entropy in Equation II may be calculated as shown in the following Equation III:

$$\text{Entropy}(C) = -\Sigma_{c \in 0|1} p(C=c) * \log_2 p(C=c) \qquad \text{Equation III}$$

Where:
    C=a vector, where each entry can take values 0|1
    p(C=c)=probability that vector C has entries with value c, or stated another way, number of entries in vector C with value c divided by the total number of entries in vector C.

Note that in Equation III, log(0)*0 is defined as 0 as per entropy formula convention.

MultiTargetEntropy (MTE) according to one embodiment means that the system is finding the combined entropy of each test case target vector (each column). In contrast to ID3 in which there is one target vector, embodiments disclosed herein use multiple target vectors, hence a multi-target vector entropy is calculated.

Note that rows in the matrices below have been composed by a filtering mechanism explained in Equation I. Therefore, they are not to be thought of like contiguous rows, but rather as the rows filtered when splitting on a certain feature value. One can think of these rows as the test case results for disjoint change lists corresponding to when a file f was changed (1) or not changed (0). For the examples below, it is easier to think that each row corresponds to the test results after a file f was changed.

Given a matrix, the system adds the entropy of each target column to arrive at the total entropy of the system, as shown in the following Equation IV:

$$\text{MTE}\left(\begin{bmatrix} 1 & 1 \\ 0 & 1 \\ 0 & 0 \\ 0 & 0 \end{bmatrix}\right) = \left[-\left(\frac{1}{4}\log_2\frac{1}{4}\right) - \left(\frac{3}{4}\log_2\frac{3}{4}\right)\right] + \left[ \qquad \text{Equation IV}\right.$$

$$\left. -\left(\frac{2}{4}\log_2\frac{2}{4}\right) - \left(\frac{2}{4}\log_2\frac{2}{4}\right)\right] = 0.81 + 1 = 1.81$$

Now, it will be shown that a matrix with different vector configurations follows a strict inequality so that we can assert that we can compare matrices overall entropy using such a method, as shown in the following Equation V:

$$\text{MTE}\left(\underbrace{\begin{bmatrix} 1 & 1 \\ 1 & 1 \\ 1 & 1 \\ 1 & 1 \end{bmatrix}}_{A}\right) < \text{MTE}\left(\underbrace{\begin{bmatrix} 1 & 1 \\ 1 & 1 \\ 1 & 1 \\ 0 & 0 \end{bmatrix}}_{B}\right) < \text{MTE}\left(\underbrace{\begin{bmatrix} 1 & 1 \\ 1 & 1 \\ 0 & 0 \\ 0 & 0 \end{bmatrix}}_{C}\right) = \qquad \text{Equation V}$$

$$0 < 1.62 < 2$$

The above follows intuition since for matrix A, we know to run the test case 0 and 1 since for all rows/samples, both test cases were activated. For matrix B, we are pretty sure we need to run them both too as there are more 1's than 0's for each test case (column). For matrix C, it is uncertain whether we should run each test since half the time they are activated, and the other half they are not. Entropy reaches its highest point of 1 for a column when the probability is 0.5, as it is the case for both columns of matrix C since it has 2/4 and 2/4 in each column. Note that this highest point of 1 is only applicable to the case where the number of states a vector entry can be in is 2, in this case we can have 0 or 1 for each entry of the vector.

It will now be explained why we can add (+) the column entropies to represent the overall entropy of the system. First, note that entropy is always positive, and therefore adding cannot reduce the overall system entropy, it can only increase it.

Now, one can think of the entropy found using the log base 2 in Equation III as the lower bound on the number of bits to transfer over a wire the state of a random variable. If the test activation matrix 266 only had one column, meaning one test case existed, then to transmit the state of such test case vector T0, on average, we would send a message with bit length equal to the entropy of such a vector.

Since we have multiple columns representing each different test case (each test case is a modeled as a random variable), we would communicate the state of each different test case over the wire. Thus, each test case contributes to the overall number of bits that are to be transmitted over the wire, where the contribution of each test case equates to the test case (column) entropy. In Equation IV above, the state of the test cases (columns) would be communicated over the wire. On average, for column 0, we need 0.81 bits, and for column 1, we need 1 bit. Each communication is independent of the previous one as they are two independent test cases (tests depend on code not on test cases), and therefore we would transmit first 0.81 bits on average for T0, and 1 bit on average for T1.

A system with total entropy less than another system implies that the total amount of bits sent over the wire on average by such system is much less than the system with the higher entropy.

Also, notice that the matrices for which we are finding entropies all have the same number of columns given this is the column dimension of the test activation matrix 266 (e.g., the number of test cases in the system does not change during a computation). Also, we will in fact have comparisons of matrices with different number of rows, but this does not affect the calculations as the entropy works along the columns, and therefore it captures the entropy along that dimension correctly irrespective of the number of samples (rows).

An interesting consequence of the column entropy formulation is the following. We expect unstable test cases that get activated irrespective of a file change to be taken into account in the calculations as unrelated to file changes. Unstable test cases will show up as going from succeeded to failed and vice versa in the test results database 226, and therefore the delta is 1 or −1, which is then encoded as a 1 in the test activation matrix. In the limit, meaning we have a highly unstable test case that in every test pass goes from succeeded to failed and vice versa, this test case will show up as a column of 1's, which has entropy of 0, something that may go against intuition. However, note that this is the case for all file changes. So every time the system chooses an attribute to split on, the entropy for such test case will be the same, mainly 0, in effect cancelling the strong influence of having a 0 entropy.

Most likely, if we look at the history of the unstable test case, we can see for example it turns on and off every so often, and it will not occur for the same files, but rather for different ones. Thus, we are likely to end up with it occurring inconsistently in random places without a defined pattern, and therefore the system will push using such low information yielding test case towards the bottom of the tree as the entropy for such test case will on average be at its highest, mainly 1.

Figure 4:
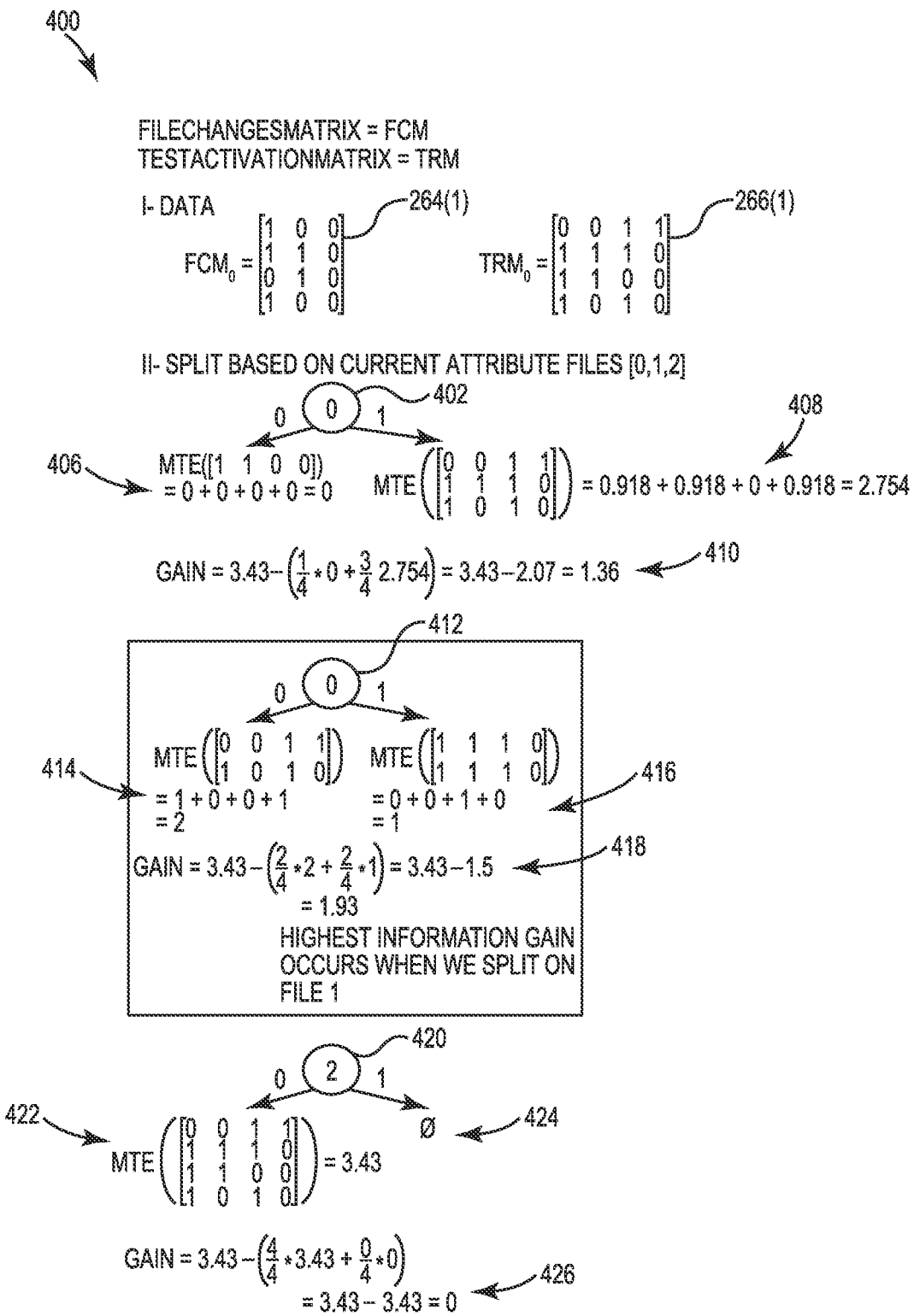
FIGS. 4 and 5 are diagrams illustrating a multi-target entropy method being applied to example matrices according to one embodiment.
Figure 5:
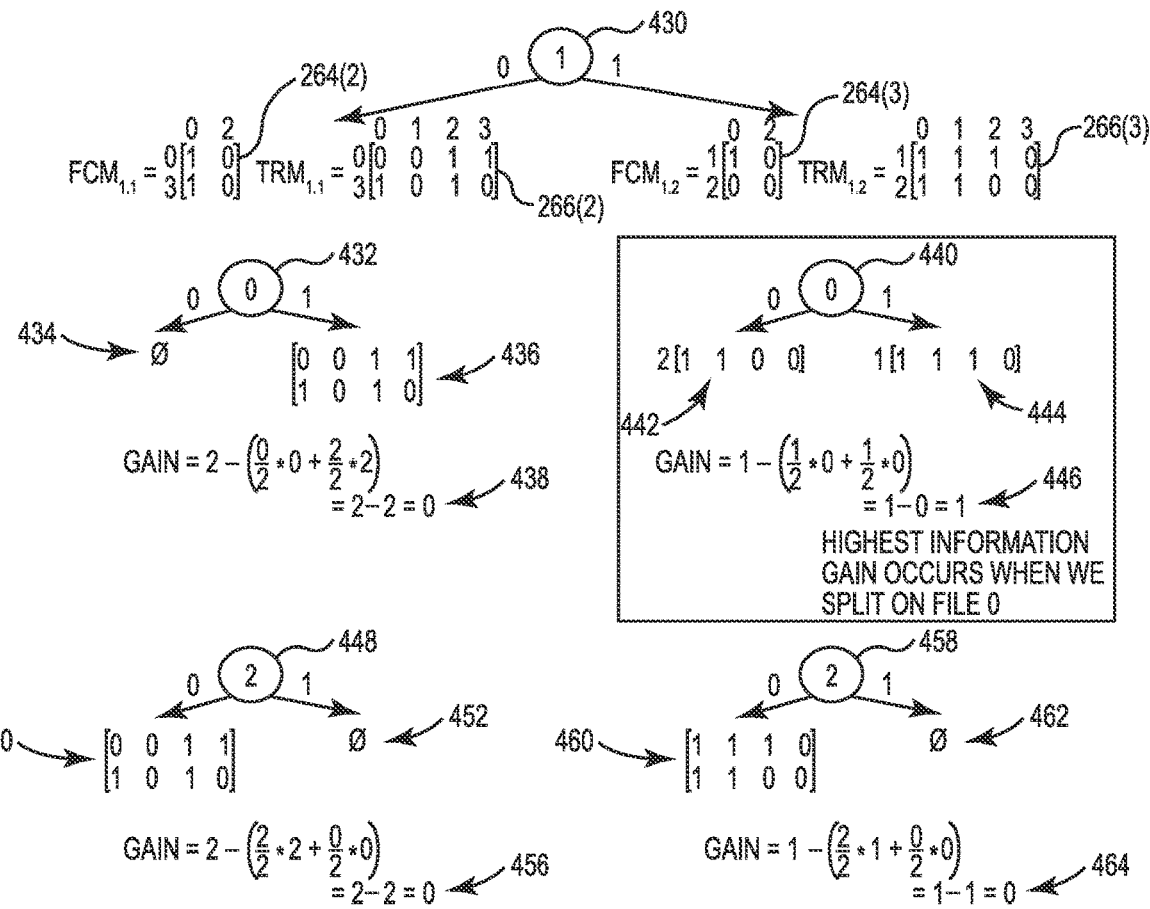

FIGS. 4 and 5 are diagrams illustrating a multi-target entropy method 400 being applied to example matrices according to one embodiment. In one embodiment, multi-target entropy component 272 (FIG. 2) is configured to perform the method 400 shown in FIGS. 4 and 5. As shown in FIG. 4, the matrices include a file changes matrix 264(1) ("FCM$_0$") and a test activation matrix 266(1) ("TRM$_0$"). The matrices 264(1) and 266(1) are 0-index based.

For the file changes matrix 264(1), each column corresponds to a particular file (i.e., column 0 corresponds to file 0, column 1 corresponds to file 1, and column 2 corresponds to file 2), and each row corresponds to particular change list (i.e., row 0 corresponds to change list 0, row 1 corresponds to change list 1, row 2 corresponds to change list 2, row 3 corresponds to change list 3). If a given file was modified in a given change list, then such an entry will contain a 1, otherwise it contains a 0.

For the test activation matrix 266(1), each column corresponds to a particular test case (i.e., column 0 corresponds to test case 0, column 1 corresponds to test case 1, column 2 corresponds to test case 2, and column 3 corresponds to test case 3), and each row corresponds to a particular change list (i.e., row 0 corresponds to change list 0, row 1 corresponds to change list 1, row 2 corresponds to change list 2, row 3 corresponds to change list 3).

Some patterns can be observed from these matrices 264(1) and 266(1). For example, whenever file 0 changes, test 2 gets activated. Thus, it would be expected that when the system 200 is presented with a change in file 0, the system 200 will predict to run test 2. As another example, whenever file 1 changes, test case 0 and test case 1 get activated. Thus, it would be expected that when the system 200 is presented with a change in file 1, the system 200 will predict to run test case 0 and test case 1. It is also noted that when file 0 and file 1 change together, then test case 0, test case 1, and test case 2 get activated.

A first step in the method 400 is to split based on the current attribute files (i.e., 0, 1, 2). Split 402 is a split based on file 0 (i.e., column 0 in matrix 264(1)). The left branch of this split 402 corresponds to the instances in which file 0 contains a "0" in matrix 264(1), and the right branch of this split 402 corresponds to the instances in which file 0 contains a "1" in matrix 264(1). Column 0 of matrix 264(1) includes a 0 at row 2. Thus, row 2 of matrix 266(1) is used for the multi-target entropy (MTE) calculation, as shown at 406, which results in a value of 0. The MTE calculation is made using Equation II above. Column 0 of matrix 264(1) includes 1's at rows 0, 1, and 3). Thus, rows 0, 1, and 3 of matrix 266(1) are used for the MTE calculation, as shown at 408, and a value of 2.754 is obtained. The gain is then calculated at 410, and a value of 1.36 is obtained. The gain is calculated using Equation I above.

Split 412 is a split based on file 1 (i.e., column 1 in matrix 264(1)). The left branch of this split 412 corresponds to the instances in which file 1 contains a "0" in matrix 264(1), and the right branch of this split 412 corresponds to the instances in which file 1 contains a "1" in matrix 264(1). Column 1 of matrix 264(1) includes 0's at rows 0 and 3. Thus, rows 0 and 3 of matrix 266(1) are used for the MTE calculation, as shown at 414, which results in a value of 2. Column 1 of matrix 264(1) includes 1's at rows 1 and 2. Thus, rows 1 and 2 of matrix 266(1) are used for the MTE calculation, as shown at 416, and a value of 1 is obtained. The gain is then calculated at 418, and a value of 1.93 is obtained.

Split 420 is a split based on file 2 (i.e., column 2 in matrix 264(1)). The left branch of this split 420 corresponds to the instances in which file 2 contains a "0" in matrix 264(1), and the right branch of this split 420 corresponds to the instances in which file 2 contains a "1" in matrix 264(1). Column 2 of matrix 264(1) includes 0's at rows 0, 1, 2, and 3. Thus, rows 0, 1, 2, and 3 of matrix 266(1) are used for the MTE calculation, as shown at 422, which results in a value of 3.43. Column 2 of matrix 264(1) does not include any 1's. Thus, no rows of matrix 266(1) are used for the MTE calculation, as shown at 424, and a value of 0 is obtained. The gain is then calculated at 426, and a value of 0 is obtained.

A comparison of the three gain values shown in FIG. 4 indicates that the highest information gain occurs when splitting on file 1. A next step in the method 400 is to split based on the remaining attribute files (i.e., 0, 2). For this step, new file changes matrices and test activation matrices are computed by splitting on file 1. Split 430 is a split based on file 1 (i.e., column 1 in matrix 264(1)). The left branch of this split 430 corresponds to the instances in which file 1 contains a "0" in matrix 264(1), and the right branch of this split 430 corresponds to the instances in which file 1 contains a "1" in matrix 264(1). File 1 contains a "0" in rows 0 and 3 of matrix 264(1). Thus, a file change matrix 264(2) ("FCM$_{1,1}$") is generated that includes row 0 and row 3 from matrix 264(1) for file 0 and file 2, and a test activation matrix 266(2) ("TRM$_{1,1}$") is generated that includes row 0 and row 3 from matrix 266(1). File 1 contains a "1" in rows 1 and 2 of matrix 264(1). Thus, a file change matrix 264(3) ("FCM$_{1,2}$") is generated that includes row 1 and row 2 from matrix 264(1) for file 0 and file 2, and a test activation matrix 266(3) ("TRM$_{1,2}$") is generated that includes row 1 and row 2 from matrix 266(1). The rows and columns of these matrices are explicitly numbered in FIG. 5, and this numbering is used in the discussion below.

Split 432 is a split based on file 0 (i.e., column 0 in matrix 264(2)). The left branch of this split 432 corresponds to the instances in which file 0 contains a "0" in matrix 264(2), and the right branch of this split 432 corresponds to the instances in which file 0 contains a "1" in matrix 264(2). Column 0 of matrix 264(2) does not include any 0's. Thus, no rows of matrix 266(2) are used for the MTE calculation, as shown at 434, and a value of 0 is obtained. Column 0 of matrix 264(2) includes 1's at rows 0 and 3. Thus, rows 0 and 3 of matrix 266(2) are used for the MTE calculation, as shown at 436. The gain is then calculated at 438, and a value of 0 is obtained.

Split 440 is a split based on file 0 (i.e., column 0 in matrix 264(3)). The left branch of this split 440 corresponds to the instances in which file 0 contains a "0" in matrix 264(3), and the right branch of this split 440 corresponds to the instances in which file 0 contains a "1" in matrix 264(3). Column 0 of matrix 264(3) includes a 0 at row 2. Thus, row 2 of matrix 266(3) is used for the MTE calculation, as shown at 442. Column 0 of matrix 264(3) includes a 1 at row 1. Thus, row 1 of matrix 266(3) is used for the MTE calculation, as shown at 444. The gain is then calculated at 446, and a value of 1 is obtained.

Split 448 is a split based on file 2 (i.e., column 2 in matrix 264(2)). The left branch of this split 448 corresponds to the instances in which file 2 contains a "0" in matrix 264(2), and the right branch of this split 448 corresponds to the instances in which file 2 contains a "1" in matrix 264(2). Column 2 of matrix 264(2) includes a 0 at rows 0 and 3. Thus, rows 0 and 3 of matrix 266(2) are used for the MTE calculation, as shown at 450. Column 2 of matrix 264(2) does not include any 1's. Thus, no rows of matrix 266(2) are used for the MTE calculation, as shown at 452, and a value of 0 is obtained. The gain is then calculated at 456, and a value of 0 is obtained.

Split 458 is a split based on file 2 (i.e., column 2 in matrix 264(3)). The left branch of this split 458 corresponds to the instances in which file 2 contains a "0" in matrix 264(3), and the right branch of this split 458 corresponds to the instances in which file 2 contains a "1" in matrix 264(3). Column 2 of matrix 264(3) includes a 0 at rows 1 and 2. Thus, rows 1 and 2 of matrix 266(3) are used for the MTE calculation, as shown at 460. Column 2 of matrix 264(3) does not include any 1's. Thus, no rows of matrix 266(3) are used for the MTE calculation, as shown at 462, and a value of 0 is obtained. The gain is then calculated at 464, and a value of 0 is obtained.

A comparison of the four gain values shown in FIG. 5 indicates that the highest information gain occurs when splitting on file 0 at 440. FIG. 5 shows the final tree 470. Split 472 is a split based on file 1 (i.e., column 1 in matrix 264(1)). The left branch of this split 472 corresponds to the instances in which file 1 contains a "0" in matrix 264(1), and the right branch of this split 472 corresponds to the instances in which file 1 contains a "1" in matrix 264(1). Column 1 of matrix 264(1) includes a 0 at rows 0 and 3. Thus, rows 0 and 3 of matrix 266(1) will be output, as shown at 474. In the illustrated embodiment, a majority rule is applied to each of the columns in the output shown at 474 to produce a final output of [0 0 1 0]. In one form of this rule, a "1" is output for a column only if both rows contain a "1". In other embodiments, other rules may be applied. The final output of [0 0 1 0] predicts that test cases 0, 1, and 3 should not be run, and that test case 2 should be run.

Split 476 is a split based on file 0 (i.e., column 0 in matrix 264(3)). The left branch of this split 476 corresponds to the instances in which file 0 contains a "0" in matrix 264(3), and the right branch of this split 476 corresponds to the instances in which file 0 contains a "1" in matrix 264(3). Column 0 of matrix 264(3) includes a 0 at row 2. Thus, row 2 of matrix 266(3) will be output, as shown at 478. The output of [1 1 0 0] predicts that test cases 0 and 1 should be run, and that test cases 2 and 3 should not be run. Column 0 of matrix 264(3) includes a 1 at row 1. Thus, row 1 of matrix 266(3) will be output, as shown at 480. The output of [1 1 1 0] predicts that test cases 0, 1, and 2 should be run, and that test case 3 should not be run.

Some embodiments may use different techniques than those described above. For example, an embodiment may use a modified decision forest rather than a single decision tree to output the predictors. An embodiment may model the problem as a Latent Semantic Analysis problem rather than a decision tree problem, which then clusters in a high dimensional space both the tests and the files that have shown to have a relationship. A K-Nearest-Neighbors or related method can then be used to query the cluster to obtain what tests to run or what files to fix given a set of files or test failures respectively. Another embodiment may model the problem as Hidden Markov Model where the probabilities of test failures given a set of file changes get updated with every observation of a snapshot in the snapshot database 246. The system can then query the posterior distribution of the test failures given a set of file changes to obtain a probability distribution over the test cases, from which the system can select those test cases with highest probabilities.

Figure 6:
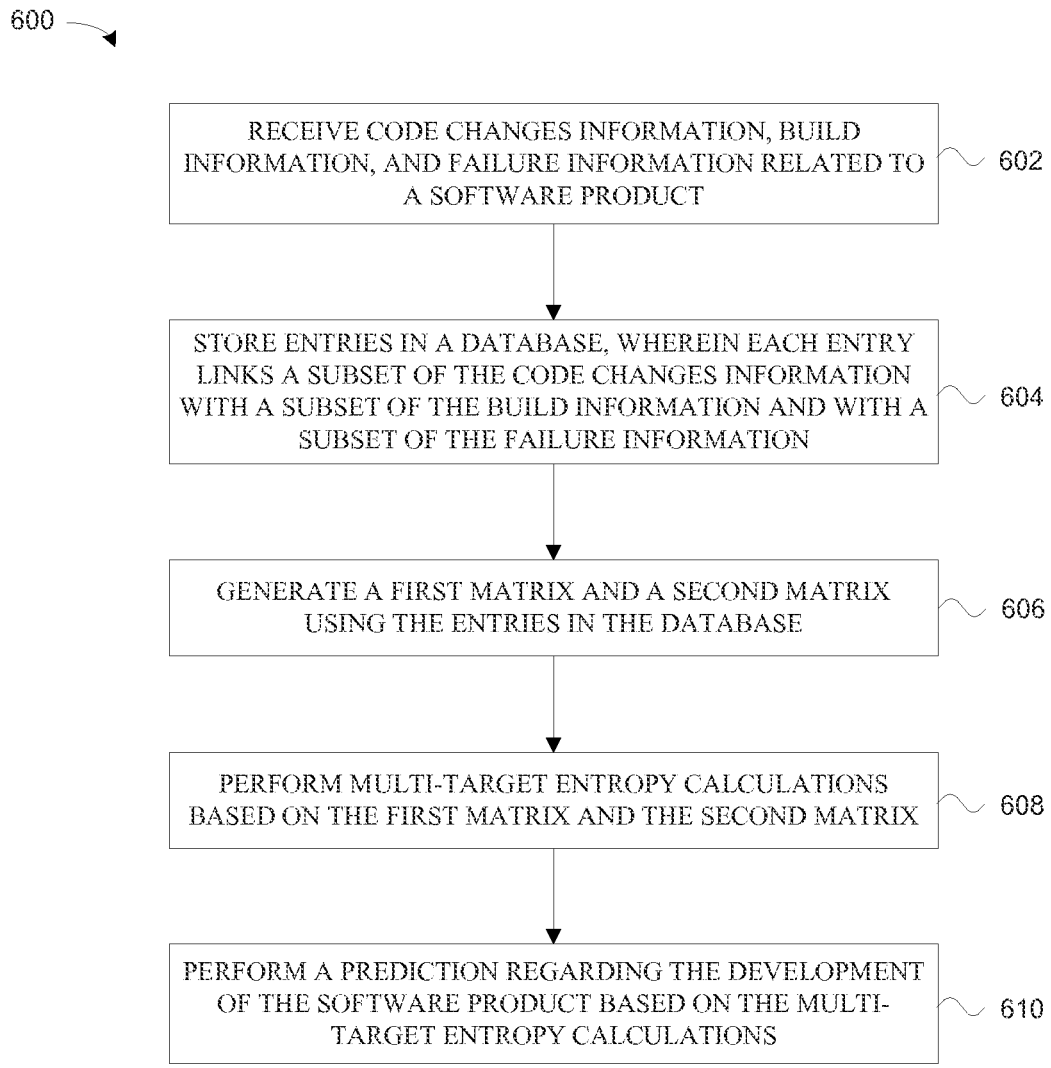
FIG. 6 is a flow diagram illustrating an automated method of making a prediction regarding development of a software product according to one embodiment.

FIG. 6 is a flow diagram illustrating an automated method 600 of making a prediction regarding development of a software product according to one embodiment. In one embodiment, prediction system 200 (FIG. 2) is configured to perform method 600. At 602 in method 600, code changes information, build information, and failure information related to the software product are received. At 604, entries are stored in a database, wherein each entry links a subset of the code changes information with a subset of the build information and with a subset of the failure information. At 606, a first matrix and a second matrix are generated using the entries in the database. At 608, multi-target entropy calculations are performed based on the first matrix and the second matrix. At 610, the prediction regarding the development of the software product is performed based on the multi-target entropy calculations.

In one embodiment of method 600, the receiving, storing, generating, performing multi-target entropy calculations, and performing the prediction are performed by at least one processor. In one embodiment, method 600 further includes generating at least one decision tree based on the multi-target entropy calculations; and performing the prediction using the at least one decision tree.

In one embodiment of method 600, the first matrix is a file changes matrix that identifies, for each of a plurality of change lists, files that have been modified by that change list, and the second matrix is a test activation matrix that identifies, for each of the plurality of change lists, test cases that have been activated by that change list. The first matrix and the second matrix according to one embodiment are binary matrices.

In one embodiment of method 600, the first matrix is used as a feature matrix and the second matrix is used as a target matrix in the multi-target entropy calculations; and the prediction is a prediction of test cases to run based on a given file change list. In another embodiment, the second matrix is used as a feature matrix and the first matrix is used as a target matrix in the multi-target entropy calculations; and the prediction is a prediction of a set of files to change based on a given set of test failures.

In one embodiment of method 600, the file changes information includes a plurality of entries, and each entry corresponds to a change list and identifies a set of files corresponding to that change list; the build information includes a plurality of entries, and each entry corresponds to a build and identifies a set of change lists corresponding to that build; and the test results information includes a plurality of entries, and each entry corresponds to a build and identifies a set of test cases corresponding to that build, and each entry includes an indicator for each test case indicating whether the test case failed or succeeded. In one embodiment, each entry in the database includes a test delta indicator for each of a plurality of test cases, wherein the test delta indicator for each test case provides a first indication when the test case first begins to fail, a second indication when the test case maintains a previous failed or succeeded state, and a third indication when the test case ceases to fail.

Another embodiment is directed to a computer-readable storage medium storing computer-executable instructions that when executed by at least one processor cause the at least one processor to perform a method. The method includes receiving code changes information, build information, and failure information related to a software product; storing entries in a database, wherein each entry links a subset of the code changes information with a subset of the build information and with a subset of the failure information; generating a plurality of matrices based on the entries in the database; performing multi-target entropy calculations based on the plurality of matrices; and performing a prediction regarding development of the software product based on the multi-target entropy calculations.

Yet another embodiment is directed to an automated method of making a prediction regarding development of a software product. The method includes storing entries in a database, wherein each entry represents a snapshot of the development of the software product and links a subset of file changes information with a subset of build information and with a subset of test results information; generating a plurality of matrices using the entries in the database; performing multi-target entropy calculations using a first one of the matrices as a feature matrix and a second one of the matrices as a target matrix; generating at least one decision tree based on the multi-target entropy calculations; and performing the prediction regarding the development of the software product using the at least one decision tree.

Although some embodiments discuss the granularity of a file, granularity is not a constraining factor, and the same techniques can be applied to any granularity so long as a unique Id can be attached to the object of such granularity, meaning such object can be made unique, which they all can: . . . ->Path->Directory->File->Code-Block->Code-Classes->Code-Functions->Code-Line-> . . .

A file according to one embodiment comprises code files, config files, data files, and may include other files. A file according to one embodiment is the medium that contains developer changes, whatever those changes are.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An automated method of making a prediction regarding development of a software product, comprising:
receiving code changes information, build information, and failure information related to the software product;
storing entries in a database in at least one memory, wherein each entry links a subset of the code changes information with a subset of the build information and with a subset of the failure information, and wherein each entry in the database includes a test delta indicator for each of a plurality of test cases, wherein the test delta indicator for each test case provides a first indication when the test case first begins to fail, a second indication when the test case maintains a previous failed or succeeded state, and a third indication when the test case ceases to fail;
generating, with at least one processor, a first matrix and a second matrix using the entries in the database, and storing the first matrix and the second matrix in the at least one memory;
performing, with the at least one processor, multi-target entropy calculations based on the first matrix and the second matrix, wherein the multi-target entropy calculations comprise entropy calculations that involve mapping multiple features to multiple target variables; and
performing, with the at least one processor, the prediction regarding the development of the software product based on the multi-target entropy calculations.

2. The method of claim 1, and further comprising:
generating at least one decision tree based on the multi-target entropy calculations; and
performing the prediction using the at least one decision tree.

3. The method of claim 1, wherein the first matrix is a file changes matrix that identifies, for each of a plurality of change lists, files that have been modified by that change list, and wherein the second matrix is a test activation matrix that identifies, for each of the plurality of change lists, test cases that have been activated by that change list.

4. The method of claim 3, wherein the first matrix and the second matrix are binary matrices.

5. The method of claim 3, wherein the first matrix is used as a feature matrix storing the multiple features and the second matrix is used as a target matrix storing the multiple target variables in the multi-target entropy calculations.

6. The method of claim 5, wherein the prediction is a prediction of test cases to run based on a given file change list.

7. The method of claim 3, wherein the second matrix is used as a feature matrix storing the multiple features and the first matrix is used as a target matrix storing the multiple target variables in the multi-target entropy calculations.

8. The method of claim 7, wherein the prediction is a prediction of a set of files to change based on a given set of test failures.

9. The method of claim 1, wherein the code changes information includes a plurality of entries, and wherein each entry corresponds to a change list and identifies a set of files corresponding to that change list.

10. The method of claim 1, wherein the build information includes a plurality of entries, and wherein each entry corresponds to a build and identifies a set of change lists corresponding to that build.

11. The method of claim 1, wherein the failure information includes a plurality of entries, and wherein each entry corresponds to a build and identifies a set of test cases corresponding to that build, and wherein each entry includes an indicator for each test case indicating whether the test case failed or succeeded.

12. A computer-readable storage medium storing computer-executable instructions that when executed by at least one processor cause the at least one processor to perform a method, comprising:

receiving code changes information, build information, and failure information related to a software product;

storing entries in a database in at least one memory, wherein each entry links a subset of the code changes information with a subset of the build information and with a subset of the failure information, and wherein each entry in the database includes a test delta indicator for each of a plurality of test cases, wherein the test delta indicator for each test case provides a first indication when the test case first begins to fail, a second indication when the test case maintains a previous failed or succeeded state, and a third indication when the test case ceases to fail;

generating a plurality of matrices based on the entries in the database, and storing the plurality of matrices in the at least one memory;

performing multi-target entropy calculations based on the plurality of matrices, wherein the multi-target entropy calculations comprise entropy calculations that involve mapping multiple features to multiple target variables; and performing a prediction regarding development of the software product based on the multi-target entropy calculations.

13. The computer-readable storage medium of claim 12, wherein the method further comprises:

generating at least one decision tree based on the multi-target entropy calculations; and performing the prediction using the at least one decision tree.

14. The computer-readable storage medium of claim 12, wherein the plurality of matrices include a binary file changes matrix that identifies, for each of a plurality of change lists, files that have been modified by that change list, and wherein the plurality of matrices include a binary test activation matrix that identifies, for each of the plurality of change lists, test cases that have been activated by that change list.

15. The computer-readable storage medium of claim 14, wherein the file changes matrix is used as a feature matrix and the test activation matrix is used as a target matrix in the multi-target entropy calculations, and wherein the prediction is a prediction of test cases to run based on a given file change list.

16. The computer-readable storage medium of claim 14, wherein the test activation matrix is used as a feature matrix and the file changes matrix is used as a target matrix in the multi-target entropy calculations, and wherein the prediction is a prediction of a set of files to change based on a given set of test failures.

17. An automated method of making a prediction regarding development of a software product, comprising:

storing entries in a database in at least one memory, wherein each entry represents a snapshot of the development of the software product and links a subset of file changes information with a subset of build information and with a subset of test results information, wherein each entry in the database includes a test delta indicator for each of a plurality of test cases, wherein the test delta indicator for each test case provides a first indication when the test case first begins to fail, a second indication when the test case maintains a previous failed or succeeded state, and a third indication when the test case ceases to fail;

generating, with at least one processor, a plurality of matrices using the entries in the database, and storing the plurality of matrices in the at least one memory;

performing, with the at least one processor, multi-target entropy calculations using a first one of the matrices as a feature matrix and a second one of the matrices as a target matrix, wherein the multi-target entropy calculations comprise entropy calculations that involve mapping multiple features in the feature matrix to multiple target variables in the target matrix;

generating, with the at least one processor, at least one decision tree based on the multi- target entropy calculations;

performing, with the at least one processor, the prediction regarding the development of the software product using the at least one decision tree.

* * * * *